United States Patent [19]
Galewski

[11] Patent Number: 6,162,879
[45] Date of Patent: Dec. 19, 2000

[54] CONTINUOUS PROCESS FOR POLYMERIZING A VINYL MONOMER

[75] Inventor: Jean-Marc Galewski, Noeux-les-Mines, France

[73] Assignee: BP Chemicals Limited, London, United Kingdom

[21] Appl. No.: 09/157,106

[22] Filed: Sep. 18, 1998

[30] Foreign Application Priority Data

Sep. 19, 1997 [FR] France .................................. 97 11911

[51] Int. Cl.⁷ ...................................................... C08F 2/01
[52] U.S. Cl. ........................... 526/64; 526/346; 526/920; 422/131; 422/132; 422/134; 422/138
[58] Field of Search ............................. 526/64, 920, 346; 422/138, 131, 132, 134; 203/49, 14; 122/195

[56] References Cited

U.S. PATENT DOCUMENTS

| | | |
|---|---|---|
| 4,275,177 | 6/1981 | Walkenhorst et al. . |
| 4,759,313 | 7/1988 | Dye . |
| 5,602,216 | 2/1997 | Juvet ......................................... 526/64 |

FOREIGN PATENT DOCUMENTS

| | | |
|---|---|---|
| 0 254 304 A2 | 1/1988 | European Pat. Off. . |
| 0 307 238 B2 | 3/1989 | European Pat. Off. . |
| 0 519 266 A1 | 12/1992 | European Pat. Off. . |
| 2 332 491 | 6/1977 | France . |
| 2 345 465 | 10/1977 | France . |
| PCT/97/08231 | 11/1998 | WIPO . |

Primary Examiner—David W. Wu
Assistant Examiner—R. Harlan
Attorney, Agent, or Firm—Finnegan, Henderson, Farabow, Garrett and Dunner, L.L.P.

[57] ABSTRACT

The present invention relates to a continuous process for polymerizing a vinyl monomer wherein a liquid reaction mixture flows through a tubular reactor equipped with a primary heat exchanger connected to a primary cooling loop where a primary coolant liquid circulates, optionally cooled by contact with a secondary heat exchanger fitted in the said primary loop and placed in a heat exchange zone of a secondary cooling device containing a secondary coolant liquid. The primary coolant liquid employed in the absence of a secondary cooling device or the secondary coolant liquid consists essentially of superheated water under pressure which produces low-pressure steam which preferably is recovered at least partly thermally or energetically.

38 Claims, 6 Drawing Sheets

CONTINUOUS PROCESS FOR POLYMERIZING A VINYL MONOMER

BACKGROUND OF THE INVENTION

The present invention relates to a continuous process for production of polymer by an exothermic polymerization reaction, and to a process for regulating the temperature of a reaction mixture used during this reaction.

Vinyl polymers have been known for a long time, especially styrene-based ones, which are employed in many fields, in particular polystyrenes such as transparent polystyrenes or expandable polystyrenes, styrene copolymers especially with acrylonitrile (SAN), polystyrenes modified with natural or synthetic rubber, such as high impact polystyrenes (HIPS), or ABS.

For economic reasons it is preferable to produce these polymers by continuous processes and at high space-time-yield. Among the continuous processes and according to the field of application of these polymers, there are known processes for polymerization in bulk in the liquid monomer optionally in the presence of a small proportion up to 20% by weight of an inert diluent, or in solution in an inert solvent, or else in aqueous suspension. The polymerization reaction may be of radical type, initiated thermally or with the aid of a catalyst generating free radicals, or of ionic type with the aid of ionic catalyst such as an anionic or cationic catalyst.

In all cases the polymerization reaction of vinyl monomer, for example styrene-based, is a highly exothermic reaction exhibiting a high heat of reaction, for example of 175 kcal/kg in the case of polystyrene. Thus, in this case, a completely adiabatic reaction would result in a self-heating of the reaction mixture by approximately 4° C. for each percentage of conversion of styrene to polymer. It is also known that the high viscosity of the reaction mixture, which increases in step with the progress of the reaction, makes heat dissipation difficult, especially through the walls of the reaction chamber, and tends to produce a polymer of a heterogeneous quality. In particular, any self-heating of the reaction mixture promotes the production of oligomers and of polymers of low molecular weight and the broadening of the molecular mass distribution. A poor control or an insufficient or imprecise control of the polymerization temperature can also have a detrimental effect on the characteristics and the size of the rubber particles formed during the grafting of the high impact-resistant polystyrenes.

Furthermore, it is also known that ionic or radical catalysts are very sensitive to temperature and can decompose prematurely or excessively, resulting, according to the case, in a catalyst deactivation or overactivation.

With the desire of investigating at the same time a process with high space-time-yield, for example higher than 80, preferably more than 100 kg of polymer per hour per cubic metre of reaction mixture, it was noticed that it became extremely important to control with a great fineness the polymerization temperature or the temperature of the reaction mixture during the stages of the process of polymer manufacture. Thus, a refined control of the temperature of the reaction mixture allows the production of a polymer of a better and more uniform quality, for example a polystyrene with a narrower molecular mass distribution or, in the case of high impact polystyrene, a narrower distribution of the particles.

When the polymerization is carried out at a temperature slightly higher than 100° C., for example from 110° to 140° C., the known processes generally employ, as coolant liquid in the cooling systems, water which is cooled by atmospheric cooling, for example with the aid of an atmospheric tower or an air-cooling device. When the desired temperature goes well above 100° C., for example to 150 or 180° C. and when sometimes the temperature exceptionally raises up to approximately 200° C. or even more in the event of heat runaway, the processes may employ, as coolant liquid, an organic heating liquid which does not decompose at these elevated temperatures and which allows the heat of polymerization to be removed efficaciously. The organic heating liquid itself may be cooled by atmospheric cooling, for example with the aid of an air-cooling device. It has also been noted that the difference in temperature between the polymerization reaction mixture and the coldest coolant liquid employed in the cooling system is much greater than 100° C. In these conditions a small fluctuation in the flow rates of the coolant liquids can result in a rapid and insufficiently controlled variation in the temperature of the reaction mixture and consequently in the polymerization temperature. It has been realized that these problems become particularly serious when the exothermic nature of the polymerization is high, for example with a heat of reaction higher than 100 kcal/kg, in particular higher than 150 kcal/kg, and that the polymerization reaction takes place in conditions of a high space-time-yield, for example higher than 80 or more especially than 100 kg of polymer per hour per cubic metre of reaction mixture.

U.S. Pat. No. 4,759,313 discloses an ethylene oxide process whereby residual heat is recovered from a reactor coolant by generating steam. The process comprises removing the heat of the reaction by a boiling coolant in a primary cooling system and by maintaining the coolant in a two phase (vapor/liquid) mixture in the said cooling system. The vaporized coolant is separated in a coolant separator from the liquid coolant which is returned to the reactor. The heat of the reaction is essentially removed by condensing the separated coolant vapor in at least one coolant condenser wherein water circulates and produces steam. The primary cooling system also comprises a coolant surge drum wherein the condensed coolant is separated from non-condensables and is returned to the coolant separator. However, the primary cooling system is a complex device under relatively high pressure comprising a coolant separator, at least one condenser and a coolant surge drum. Steam is only generated from the coolant vapor, and the non-condensable vapor is vented off and lost with detrimental effects to the environment.

Another process is disclosed in French Patent Application No. 2 332 491 for recovering heat in reactions carried out at very high temperatures, e.g. at least 260° C. and generally from 315 to 1090° C., which are not compatible with reactions of vinyl monomer polymerization.

A process has thus been found which makes it possible at the same time to reconcile the economic objectives with the environmental constraints, to improve reaction control, especially by refining the regulation of the temperature of the polymerization reaction mixture and, finally, to produce a polymer of a better and more uniform quality.

SUMMARY OF THE INVENTION

The present invention relates first of all to a continuous process for production of polymer by an exothermic polymerization reaction of at least one vinyl monomer, preferably vinylaromatic or styrenic such as styrene, including at least one polymerization stage in which a reaction mixture in the form of a liquid or of a suspension including at least the monomer and optionally at least one catalyst and the polymer being formed is flowing at a temperature higher than 100° C. and generally lower than 210° C., preferably 105 to 200° C., more particularly 110 to 190° C., as a continuous stream through at least one tubular reactor, preferably with plug flow, equipped internally with a primary heat exchanger comprising one or several stationary tubular element(s), a process characterized in that the primary heat exchanger is connected to a primary cooling loop where a primary coolant liquid circulates, optionally cooled with the aid of or by contact with a secondary heat exchanger fitted in tile said primary loop and placed in a heat exchange zone of a secondary cooling device containing a secondary coolant liquid, and in that the primary coolant liquid employed in the absence of a secondary cooling device or the secondary coolant liquid consists essentially of superheated water under pressure which, by an equilibrium or an expansion, produces steam especially continuously, which, separated from the said superheated water, is partially discharged preferably continuously out of the said primary loop or from the said secondary cooling device in the form of a low-pressure steam.

Advantageously, when the steam is partially discharged especially continuously out of the primary loop or from the secondary cooling device, the superheated water under pressure is treated by the addition of make-up water at a temperature lower than or equal to the temperature of the reaction mixture in the reactor, in particular lower than or equal to 105° C. or 110° C., for example at the ambient temperature, especially with the aim of compensating the quantities of water discharged in the form of low-pressure steam out of the said loop or from the said device.

According to the present invention it is particularly advantageous to recover the low-pressure steam at least partly thermally or energetically, for example in another part or stage of the process, or even in another process. Thus, it is advantageously possible to recover at least partly thermally or energetically the low-pressure steam in a stage of (pre)heating of one or more constituent(s) of the reaction mixture or of the reaction mixture itself feeding the tubular reactor, or in a stage preliminary to the polymerization stage carried out in the tubular reactor, for example a prepolymerization stage, or else in a stage of dissolving a natural or synthetic rubber with heating in a styrene-based monomer when a high impact styrene-based polymer is produced. The low-pressure steam can also be recovered at least partly thermally or energetically in a stage carried out after the polymerization stage carried out in the tubular reactor, for example a post-polymerization stage, or a stage of heating the reaction mixture, intended to increase the final degree of conversion of the monomer to polymer or, on the contrary, intended to halt the polymerization, or else a final stage of separation of the polymer from the unreacted monomer(s) and optionally from the oligomers, for example a stage of devolatilization of the final polymer, or else a stage of purification and of recycling of the unreacted monomer(s) and optionally of the inert solvent(s) present.

In the course of any one of these stages the low-pressure steam can be at least partly recovered, for example to run an absorption refrigerating machine.

A superheated water under pressure is known as being liquid water heated above its boiling temperature without its vaporizing, and maintained at a pressure higher than or equal to that of the said temperature. The entropy-enthalpy diagram applied in the case of a water/steam mixture, also called a Mollier diagram, makes it possible to establish the pressure/temperature relations of the mixture ("Thermodynamique générale et applications" ["General thermodynamics and applications"] by Roger Kling, second edition, 1980, Technip publishers, Paris).

The superheated water under pressure employed according to the present invention as primary or secondary coolant liquid makes it possible to cool the reaction mixture and to maintain the temperature of the said mixture at a constant desired value at more than 100° C. and generally less than 210° C., preferably at a temperature of 105 to 200° C., in particular 110 to 190° C., in the tubular polymerization reactor. Advantageously, the superheated water under pressure can be employed at a temperature ranging from 105 to 170° C., preferably 105 to 150° C. or more especially 110 to 130° C., for example 120° C. As primary coolant liquid, it can be employed preferably at a temperature of 105 to 150° C., more especially 105 to 130° C., especially for maintaining the temperature of the reaction mixture in the tubular reactor in a range extending from 105 to 160° C., preferably from 110 to 150° C. or from 110 to 140° C. As secondary coolant liquid, the superheated water under pressure can also be employed at a temperature of 105 to 180° C., preferably 110 to 170° C., especially to maintain the temperature of the reaction mixture in the tubular reactor at a temperature ranging from 110 to 190° C., preferably from 115 to 180° C.

The low-pressure steam can be discharged especially continuously out of the primary loop or from the secondary cooling device at any absolute pressure, which can preferably be used for allowing a sufficient thermal or energetic recovery. The absolute pressure of the low-pressure steam thus produced in the present invention can be chosen in a range extending from 0.12 MPa to 1.1 MPa, preferably from 0.12 MPa to 0.3 MPa.

DETAILED DESCRIPTION OF THE DRAWINGS

The present invention can be applied to the continuous production of polymers constituted above all from vinyl and especially vinylaromatic or styrenic monomers such as styrene-based monomers, for example styrene or alpha-methylstyrene, or from a mixture of vinylaromatic or styrenic monomers optionally in the presence of a nitrile or an ester of acrylic or methacrylic acid and/or of a natural or synthetic rubber, for example a copolymer of styrene with acrylonitrile and corresponding polymers modified with a natural or synthetic rubber, such as a high impact polystyrene or ABS. The present invention can also be applied to the production, for example, of polymethyl methacrylate, of polyvinyl ethers, of polyvinyl esters or of polyvinyl chloride and of other vinyl polymers.

The present invention can be suitable for carrying out a radical polymerization initiated thermally or with the aid of at least one catalyst generating free radicals, such as a peroxide, for example benzoyl or cumyl or lauroyl peroxides, or peracetates or other peroxides, such as those cited in Kunststoffe 80 (1990), 7, pages 830 to 837. It can also be suitable for carrying out an ionic polymerization in the presence of an anionic or cationic catalyst such as secbutyllithium, cumylpotassium, diphenylmethylpotassium, fluorenylpotassium or lithium chloride.

The present invention can also be suitable for carrying out a polymerization in bulk or in aqueous suspension or in solution in an inert solvent.

The polymerization may be carried out in conditions such that the reaction mixture flows in the reactor at an absolute pressure higher than atmospheric pressure and lower than 10 MPa, preferably lower than 6 MPa.

The type of reactor which is suitable in the present invention is a tubular reactor equipped internally with a primary heat exchanger comprising one or a number of stationary tubular elements. A plug flow tubular reactor can be advantageously employed. More particularly, a tubular reactor is preferred in which the primary heat exchanger has a heat exchange specific area of at least 50, preferably of at least 80 and more especially of at least 100 m$^2$ per cubic metre of the reaction mixture present in the said reactor. Among these reactors with a high heat exchange specific area preference is given to those equipped internally with a primary heat exchanger whose stationary tubular element(s) produces(produce) in the reactor simultaneously the effects of a static mixer and of a heat exchanger. Especially preferred are those producing the effects of a static mixer with radial or transverse diffusion (that is to say perpendicularly to the direction of flow of the reaction mixture through the reactor). To obtain the double effect of a static mixer and of a heat exchanger, the primary coolant liquid preferably flows inside the stationary tubular element(s) of the primary heat exchanger, whereas the reaction mixture flows outside the said element(s). The reverse arrangement, that is to say the stationary tubular element(s) through which the reaction mixture passes and which are surrounded by the primary coolant liquid, is also possible. However, the first arrangement is preferred. The tubular reactors with a double effect of static mixer and of heat exchanger are described, for example, in U.S. Pat. No. 4,275,177 and are known by the name of reactor/static mixer of Sulzer type. Other reactors may be of Kenix or Toray or Ross type. These reactors may be associated and employed in series with the result that the polymerization reaction mixture flows in a continuous stream successively through each of them, as described in European Patent Applications No. 0 254 304 and No. 0 307 238.

Among the tubular reactors with a high heat exchange specific area it is also possible to employ those equipped internally with a primary heat exchanger whose stationary tubular elements form inside the reactor a bundle of tubes of inner diameter ranging, for example, from 10 to 50 mm and of length, for example, of at least 400 mm, it being possible for the height of the bundle to measure at least twice its diameter. The volume of the primary heat exchanger with a tube bundle may contain at least 50%, preferably at least 70% of the total volume of the reactor. The polymerization reaction mixture may flow within the tubes while the primary coolant liquid bathes the latter from the outside. The reverse arrangement, that is to say the tubes through which the primary coolant liquid passes and which are surrounded by the reaction mixture, is also possible. When one of these reactors with a tube bundle is employed, it is preferred that, before flowing through the said reactor, the reaction mixture should pass in a continuous stream through a static mixer. These reactors may be arranged in a closed conduit, that is to say a loop for recirculating or recycling a continuous flow of the reaction mixture. The closed conduit may include a pump included to circulate the reaction mixture in the said closed conduit and successively, in the direction of flow of the said mixture, a static mixer, then the reactor with a tube bundle, optionally followed by a second static mixer and a second reactor with a tube bundle. The closed conduit may also generally include at least one feed point for monomer and optionally for catalyst and a point for removal of the reaction mixture containing especially the polymer produced. The tube bundle reactors of this type are described, for example, in European Patent No. 0 519 266.

According to one of the aspects of the present invention, when the process is carried out in the absence of a secondary cooling device it is particularly recommended that the difference between the maximum temperature of the reaction mixture flowing in the tubular reactor and the temperature of the superheated water under pressure of the primary cooling loop at the entry of the primary heat exchanger of the said reactor is as low as possible, in particular at most 30° C., preferably at most 20° C. and more especially at most 15° C.

It has also been found that the use of superheated water under pressure in such continuous polymerization processes considerably improves the control of the polymerization temperature with a hitherto unequalled precision or fineness, and this in addition makes it possible to manufacture polymers of a better and much more uniform quality in the course of time. Thus, the small temperature difference marked previously in the total device for cooling of the process makes it possible to provide a high speed of response while guaranteeing a high precision in the control of the temperature as soon as the latter fluctuates slightly. Another, and by no means insignificant, advantage appears in the fact that with the use of superheated water under pressure both as primary and secondary coolant liquid, a rapid make-up of water and especially of cold water, for example at ambient temperature, can be performed rapidly in the event of runaway of the polymerization reaction, with the aim of freezing the said reaction.

Figure 1:
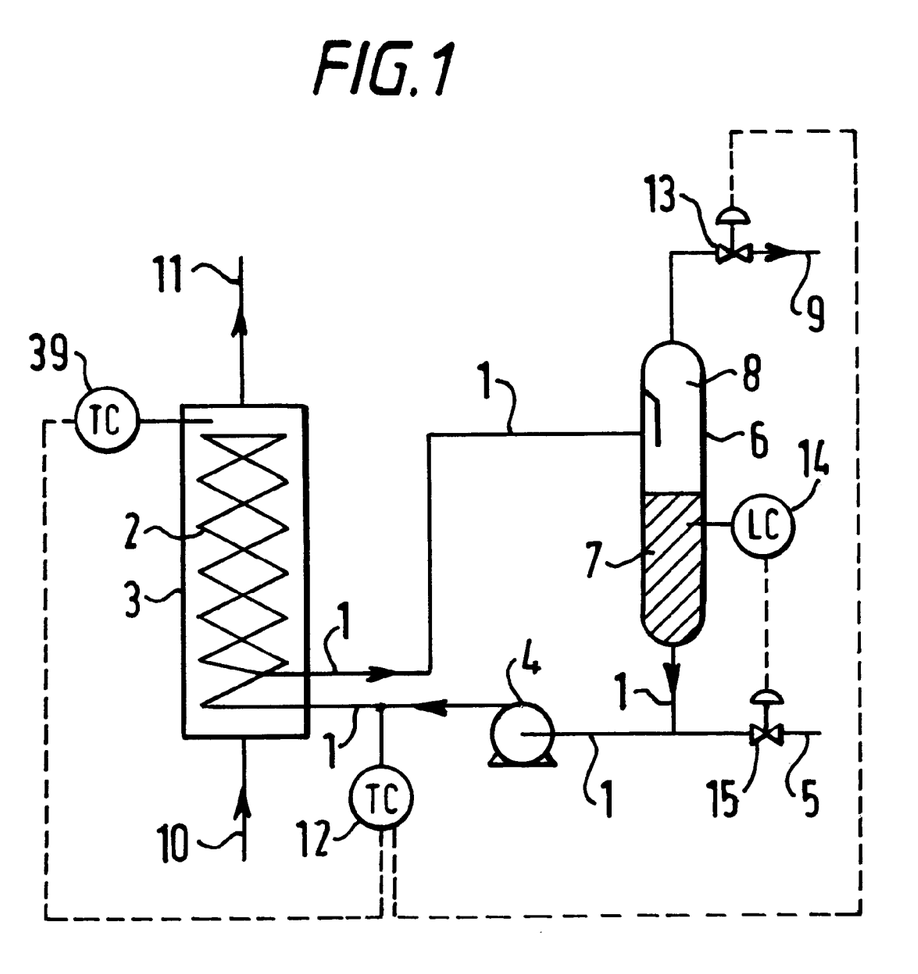
FIG. 1 shows diagrammatically equipment allowing the process of the invention to be implemented especially in the absence of a secondary cooling device.

A typical example of the process according to the present invention, carried out in the absence of a secondary cooling device, is shown by way of illustration in FIG. 1. Thus, the primary cooling loop (1) includes the primary heat exchanger (2) placed inside the tubular reactor (3) and is intended to cool the reaction mixture, a pump (4) intended to circulate the superheated water under pressure inside the primary loop (1), optionally a make-up (5) of water opening into the primary loop (1), preferably at a temperature such as mentioned above, and an expansion zone (6) where the superheated water (7) under pressure is expanded, preferably continuously, to produce steam (8) which, separated from tile said superheated water, is partially discharged, especially continuously, out of the primary loop (1), for example with the aid of a stop valve (13), to produce low-pressure steam, for example in a conduit (9).

As described above, the low-pressure steam thus produced, preferably continuously, can be advantageously recovered at least partly thermally or energetically.

According to FIG. 1, the tubular reactor (3) may be fed continuously with reaction mixture via a feed conduit (10), the said mixture being drawn off continuously from the said reactor via a discharge conduit (11). In addition the temperature of the reaction mixture flowing through the reactor (3) can be regulated by measuring especially the temperature of the superheated water under pressure circulating in the primary loop (1) before the entry into the heat exchanger (2) and by comparing the temperature value thus measured with a desired value fixed in advance by virtue of a primary temperature regulating device TC (12) which allows the temperature to be corrected and adjusted by an action of opening or closing of the stop valve (13). The device TC (12) itself is combined in cascade with a primary temperature regulating device TC (39) intended to control especially the temperature of the reaction mixture at the tail of the tubular reactor (3).

The quantity of superheated water (7) in the expansion zone (6) can also be regulated by measuring the level of superheated water (7) in the said zone with the aid of a control device for detection of liquid level LC (14), which compares the level value thus measured with a desired value fixed in advance and by consequently actuating, by virtue of the device (14), the opening or the closing of a stop valve (15) placed on the water make-up (5).

The tubular reactor (3) equipped with the primary cooling loop (1) as shown in FIG. 1 can be placed in an open conduit (that is to say without recirculation or recycling) of a continuous flow of the reaction mixture. It can also be placed advantageously in a closed conduit (that is to say a recirculation or recycling loop) of a continuous flow of the reaction mixture, including at least the tubular reactor (3), a pump intended to circulate the reaction mixture continuously through the said closed conduit, at least one feed point for monomer and optionally for catalyst, a discharge point for the reaction mixture and optionally one or more heat exchanger(s) and/or static mixer(s). Such an arrangement is described, for example, in European Patent Application No. 0 755 945.

Figure 2:
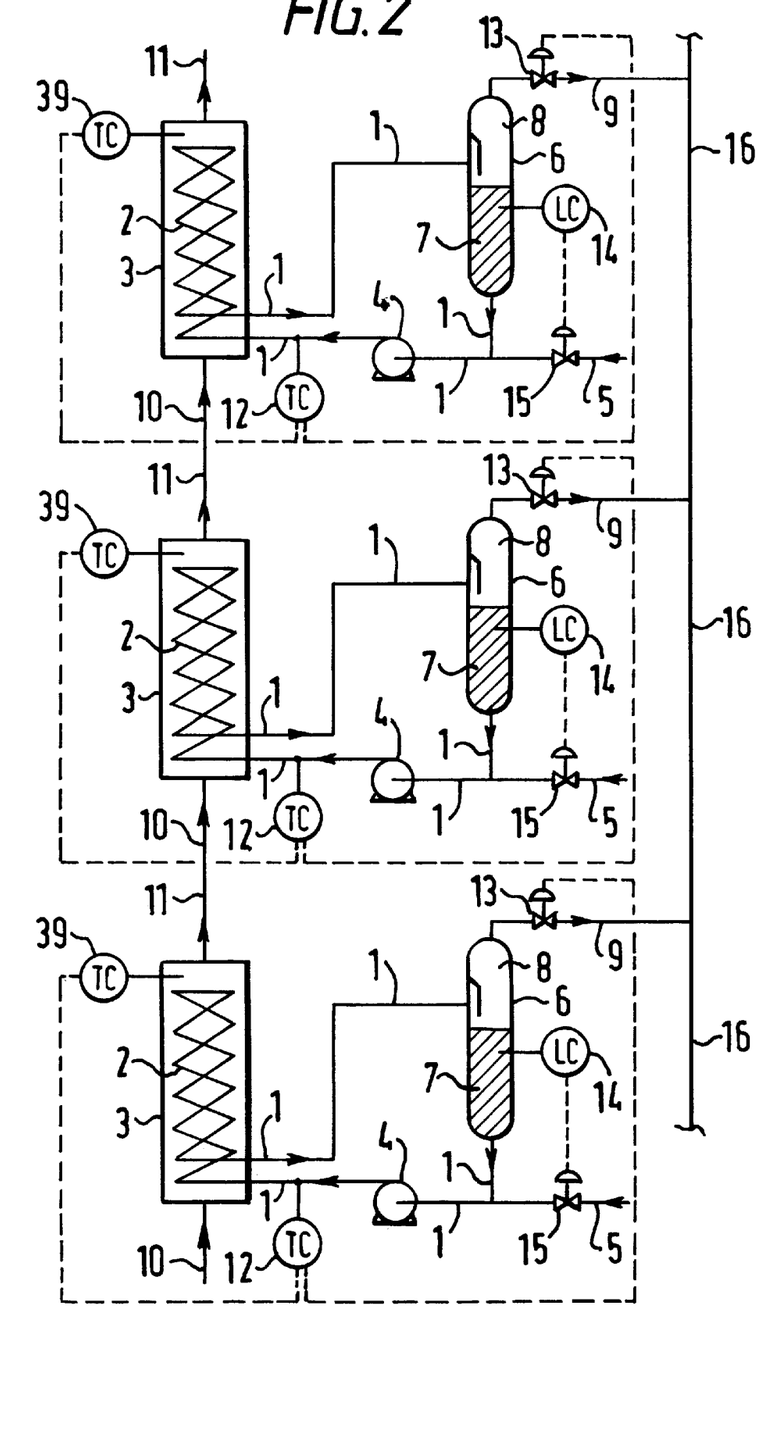
FIG. 2 shows diagrammatically equipment allowing the process of the invention to be implemented especially in the case where a number of tubular reactors are employed in series with primary cooling loops similar to that shown in FIG. 1.

Another typical example of the process according to the present invention, carried out in the absence of a secondary cooling device, relates to a process where the reaction mixture flows as a continuous stream successively through two or more tubular reactors (3) (for example three tubular reactors (3) as shown in FIG. 2). In this process, as shown in FIG. 2, each tubular reactor (3) has its own primary cooling loop (1) which includes the primary heat exchanger (2) placed inside the said reactor and intended to cool the reaction mixture, a pump (4) intended to circulate the superheated water under pressure inside the said loop, optionally a make-up (5) of water opening into the said loop preferably at a temperature such as mentioned above, and an expansion zone (6) where the superheated water (7) under pressure is expanded to produce steam (8), especially continuously, which, separated from the said superheated water, is partially discharged, preferably continuously, out of the said loop, for example with the aid of a stop valve (13), to produce low-pressure steam, for example in a conduit (9). The low-pressure steam is preferably recovered and continuously combined with low-pressure steam produced by the other tubular reactors (3) in the same steam system (16).

As described above, the low-pressure steam thus produced, preferably continuously, can be advantageously recovered at least partially thermally or energetically. Each tubular reactor (3), as shown in FIG. 2, has its own primary cooling loop (1) as shown in FIG. 1, with identical components, indicated with the same reference numbers. Furthermore, each primary cooling loop (1) can function with systems for regulating temperature TC (12) and TC (39) and liquid level LC (14) as described above at FIG. 1 with identical components, indicated with the same reference numbers. According to FIG. 2, the discharge conduit (11) for the reaction mixture leaving the first reactor (3) in the direction of flow of the said mixture is connected to the feed conduit (10) of the second reactor (3), and the discharge and feed conduits are thus connected between them from one reactor to the other, such that the reaction mixture flows as a continuous stream successively in all the tubular reactors (3). The latter may be especially placed in series in an open or closed conduit of a continuous flow of the reaction mixture, as described above.

The typical examples of the process according to the present invention, carried out in the absence of a secondary cooling device, as described above and especially shown diagrammatically in FIGS. 1 and 2, can be particularly useful when the polymerization reaction is carried out in the tubular reactor(s) (3) according to an aqueous suspension process, for example an aqueous suspension polymerization of styrene, at a temperature which can range from 105 to 160° C., preferably from 110 to 150° C. or from 110 to 140° C., optionally with a temperature profile which increases especially gradually or in plateau in the direction of flow of the reaction mixture. This is especially suitable for performing a process for the continuous production of an expandable styrene-based polymer, in which at least one stage of aqueous suspension polymerization of at least one styrene-based monomer is carried out in one or several tubular reactor(s) (3), where a reaction mixture flows continuously, including at least one styrene-based monomer, an inorganic or organic dispersing agent, water, a styrene-based polymer being formed and optionally a blowing agent such as a $C_3$–$C_7$ hydrocarbon, in particular propane, isobutane, n-pentane, isopentane, neopentane and/or hexane or mixtures of these hydrocarbons with carbon dioxide. An example of such a process is described in PCT Patent Application No. 97/08231. In the case of polymerization of this type, the primary heat exchanger of each of the tubular reactor(s) (3) can advantageously have a heat exchange specific area of at least 100 $m^2$ per cubic metre of the reaction mixture present in the said reactor. Furthermore, it is generally recommended in this case that the stationary tubular element(s) of the primary heat exchanger should simultaneously produce in the or in each of the reactor(s) the effects of a static mixer and of a heat exchanger, the primary coolant liquid preferably flowing inside the stationary tubular element(s) of the said exchanger while the reaction mixture flows outside the said element(s).

According to another aspect of the present invention, when the process is carried out in the presence of the secondary cooling device it is particularly recommended that the difference between the maximum temperature of the reaction mixture flowing in the tubular reactor and the minimum temperature of the superheated water under pressure in contact with the secondary heat exchanger of the said reactor is as low as possible, especially at most 80° C., preferably at most 50° C. and more especially at most 40° C. In the same circumstances it is also recommended that the difference between the temperature of the primary coolant liquid at the entry of the secondary heat exchanger and the minimum temperature of the superheated water under pressure in contact with the secondary heat exchanger is as low as possible, especially at most 75° C., preferably at most 45° C. and more especially at most 35° C. or else at most 30° C.

When the process employs a secondary cooling device the primary coolant liquid is advantageously an organic heating liquid, capable especially of not being decomposed at the elevated temperatures such as those encountered in the tubular polymerization reactor(s). The primary coolant liquid preferably circulates as a liquid one-phase stream in the primary cooling loop e.g. under the atmospheric pressure, with the help of a pump. More particularly it is continuously maintained in one phase i.e. in the liquid state. Preferably the primary coolant liquid is a non-boiling hydrocarbon in the conditions of the process, e.g. a high boiling hydrocarbon with an initial boiling temperature typically from 250° C. to 400° C., preferably from 300 to 390° C. Among the organic heating liquids it is possible to employ hydrocarbons or oils, for example "Therminol 66"® from Monsanto, "Dowtherm RP"® from Dow Chemical, "Jaritherm DBT"® from Elf Atochem or "Gilotherm"® from Rhône-Poulenc.

Figure 3:
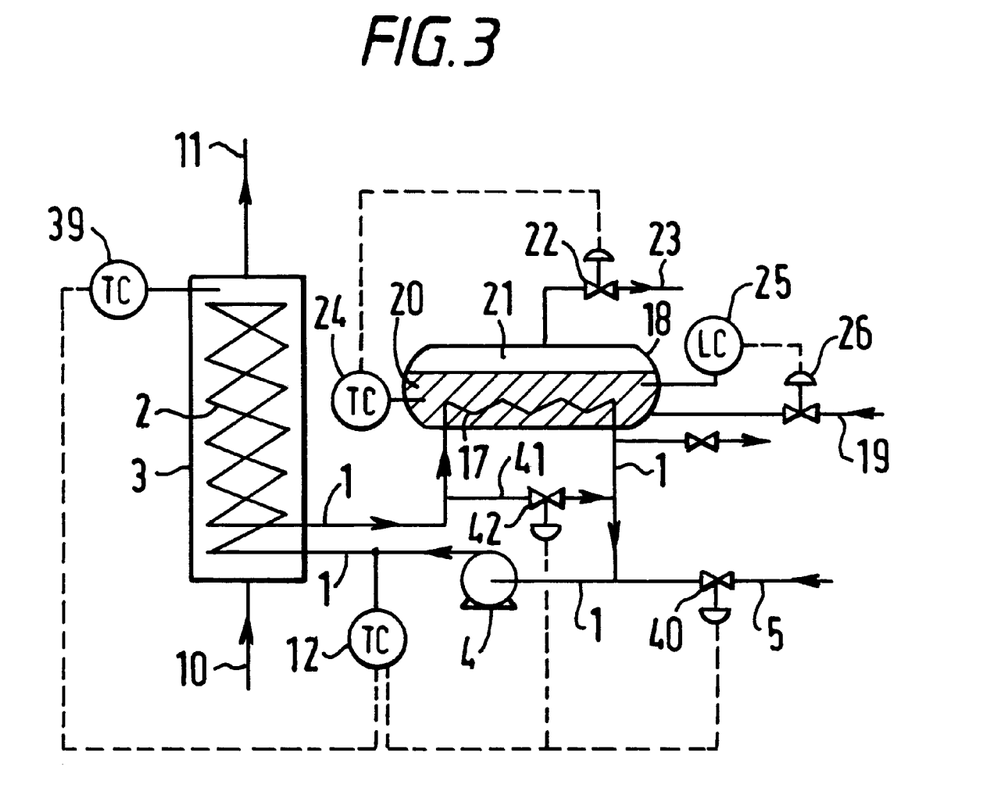
FIG. 3 shows diagrammatically equipment allowing the process of the invention to be implemented especially with a secondary cooling device consisting essentially of a boiler.

A typical example of the process according to the present invention employing the tubular reactor (3) and the secondary cooling device is shown in FIG. 3. Thus, the reaction mixture feeds the tubular reactor (3) via a feed conduit (10), flows as a continuous stream through the said reactor and is discharged out of the reactor via a discharge conduit (11). According to FIG. 3 the primary cooling loop (1) includes the primary heat exchanger (2) placed inside the reactor (3) and intended to cool the reaction mixture, a pump (4) intended to circulate the primary coolant liquid inside the said loop essentially as a liquid one-phase stream, the secondary heat exchanger (17) and optionally a make-up (5) of primary coolant liquid opening into the loop (1) preferably at a temperature higher than the temperature of the reaction mixture in the reactor. According to FIG. 3 the secondary cooling device includes essentially a heat exchange zone consisting of a boiler (18) into which a make-up (19) of water preferably opens, especially at a temperature as mentioned above. Inside the boiler (18) is placed the secondary heat exchanger (17) intended to cool the primary coolant liquid. The boiler (18) contains superheated water (20) under pressure in equilibrium with steam (21) which, separated from the said superheated water, is partially discharged, preferably continuously, out of the boiler, for example with the aid of a stop valve (22), to produce low-pressure steam, especially continuously, for example in a conduit (23). The low-pressure steam thus produced can be advantageously recovered at least partly thermally or energetically, as described above.

The tubular reactor (3) equipped with the cooling device as shown in FIG. 3 can be placed in an open conduit (that is to say without recirculation or recycling) or a closed one (that is to say a recirculation or recycling loop), of a continuous flow of the reaction mixture, as described above.

According to FIG. 3 the temperature of the reaction mixture flowing in the reactor (3) can be regulated by measuring the temperature of the superheated water under pressure inside the boiler (18) and by comparing the temperature value thus measured with a desired value fixed in advance, by virtue of a temperature regulating device TC (24) which allows the temperature to be corrected and adjusted by an action of opening or closing the stop valve (22) allowing the steam (21) to be discharged out of the boiler (18) and to produce low-pressure steam, for example in the conduit (23). Temperature regulating devices TC (12) and TC (39) corresponding respectively to the temperature of the primary coolant liquid and to that of the reaction mixture at the tail of the reactor (3) are connected to a stop valve (40) for feeding primary coolant liquid, fitted in the make-up (5) and to a stop valve (42) fitted in a bypass conduit (41) of the secondary heat exchanger (17) in the primary cooling loop (1). The device TC (12) can thus function according to the "split-range" regulation method making it possible to modulate the opening/closing either of the stop valve (42) or of the stop valve (40) in order, respectively, to cool or heat the primary coolant liquid. The quantity of superheated water (20) under pressure in the boiler (18) can also be regulated by measuring the level of superheated water (20) in the boiler with the aid of a control device for detection of liquid level LC (25), which compares the level value thus measured with a desired value fixed in advance and by consequently actuating, by virtue of the device (25), the opening or the closing of a stop valve (26) placed in a fresh-water make-up line (19).

Another typical example of the process according to the present invention employing the secondary cooling device relates to a process where the reaction mixture flows as a continuous stream successively through two or several tubular reactors (3) placed especially in series. Each tubular reactor (3) can have in particular its own primary cooling loop and its own secondary cooling device including essentially a heat exchange zone consisting of a boiler with especially all the components identical with those shown in FIG. 3. Each reactor (3) thus has its own boiler into which preferably opens a water make-up at a temperature as mentioned above. Inside each boiler is placed the secondary heat exchanger intended to cool the primary coolant liquid of the said reactor. Each boiler contains superheated water under pressure in equilibrium with steam which, separated from the said superheated water, is partially discharged, preferably continuously, out of the said boiler to produce low-pressure steam. Each boiler thus produces low-pressure steam, especially continuously, which is preferably combined with the other low-pressure steam thus produced in a single steam system. The low-pressure steam is preferably recovered, as described above, at least partly thermally or energetically. In addition, the tubular reactors (3) can be placed in series in an open or closed conduit of a continuous flow of the reaction mixture, as described above.

Figure 4:
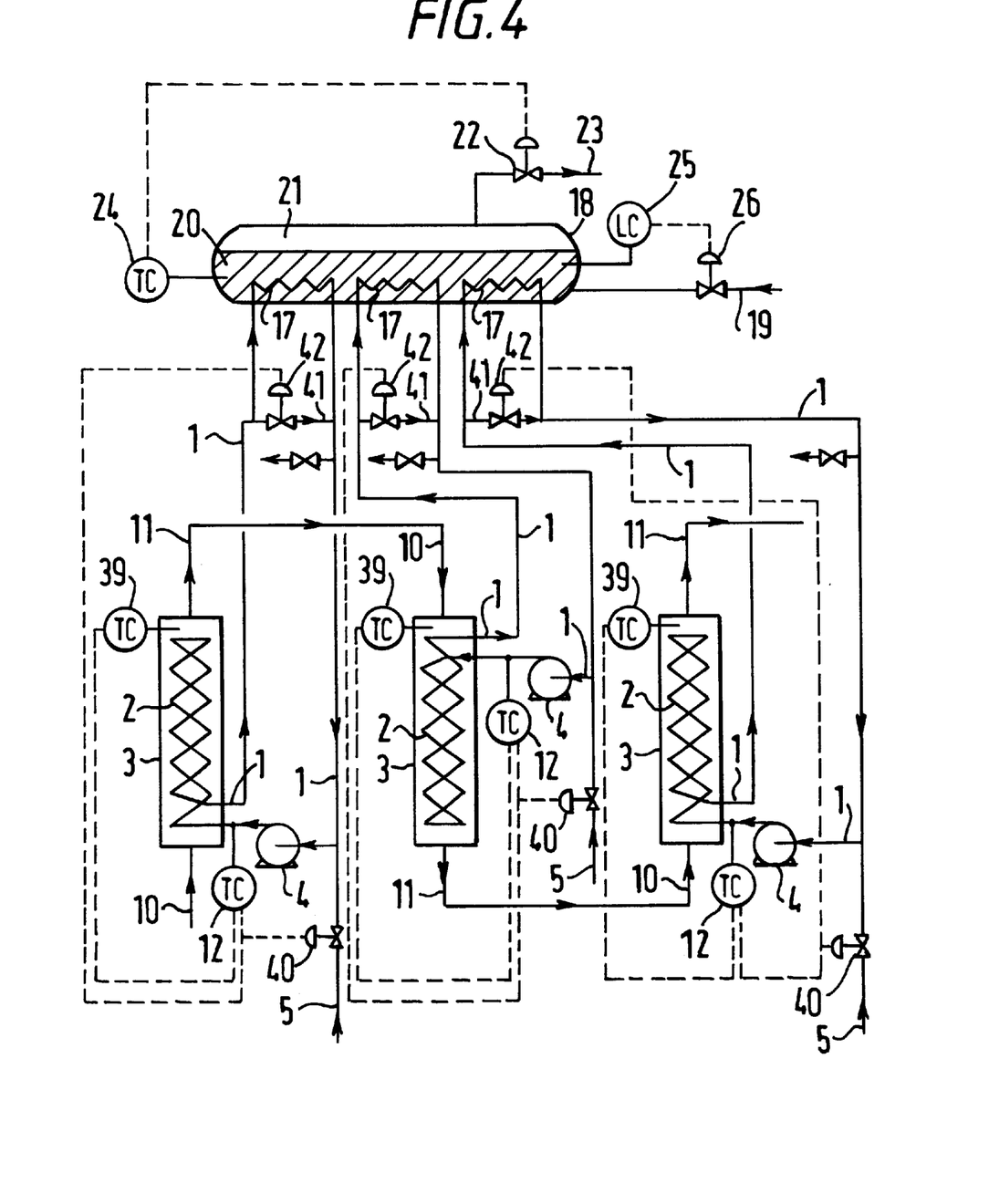
FIG. 4 shows diagrammatically equipment allowing the process of the invention to be implemented especially in the case where a number of tubular reactors are employed in series with a secondary cooling device consisting essentially of a single boiler similar to that shown in FIG. 3.

Another preferred alternative form of the process according to the present invention relates to a process where the reaction mixture flows as a continuous stream successively through two or several tubular reactors (for example three tubular reactors (3) as shown in FIG. 4), each possessing its own primary cooling loop (1). In this process, as shown in FIG. 4, the tubular reactors (3) have, especially in common, a single secondary cooling device including essentially a heat exchange zone consisting of a single boiler (18) into which preferably opens a water make-up (19) especially at a temperature as mentioned above. Inside the boiler (18) are placed the secondary heat exchangers (17) of the tubular reactors (3), intended to cool the primary coolant liquids. The single boiler (18) contains superheated water (20) under pressure in equilibrium with steam (21) which, separated from the said superheated water, is partially discharged, preferably continuously, out of the boiler (18), for example with the aid of a stop valve (22), to produce low-pressure steam, especially continuously, for example in the conduit (23). The low-pressure steam is preferably recovered, as described above, at least partly thermally or energetically. Each tubular reactor (3) as shown in FIG. 4 has its own primary cooling loop (1) as shown in FIG. 3 with identical components, indicated with the same reference numbers. The single boiler (18) as shown in FIG. 4 can have regulating systems for temperature TC (24) and for liquid level LC (25) as described above at FIG. 3 with identical components, indicated with the same reference numbers. According to FIG. 4 the discharge conduit (11) for the reaction mixture leaving the first reactor (3) in the direction of flow of the said mixture is connected to the feed conduit (10) of the second reactor (3) and thus the discharge and feed conduits are connected between them from one reactor to the other, such that the reaction mixture flows as a continuous stream successively through all the reactors (3). The latter may be especially arranged in series in an open or closed conduit of a continuous flow of the reaction mixture, as described above.

The preferred alternative form of the process thus shown in FIG. 4 has several advantages. In particular, it makes use of a single boiler with a minimum total heat exchange area. The use of a single boiler with superheated water under pressure at a single temperature to cool tile primary coolant liquids of the various tubular reactors (3) makes it possible to give a greater flexibility in the control and the regulation of the polymerization in each of the said reactors, especially when a variable and non-monotonic temperature profile is applied in the production range. To this is added an advantage in the safety of the process, especially during a reaction runaway localized specifically in one of the tubular reactors (3).

Figure 5:
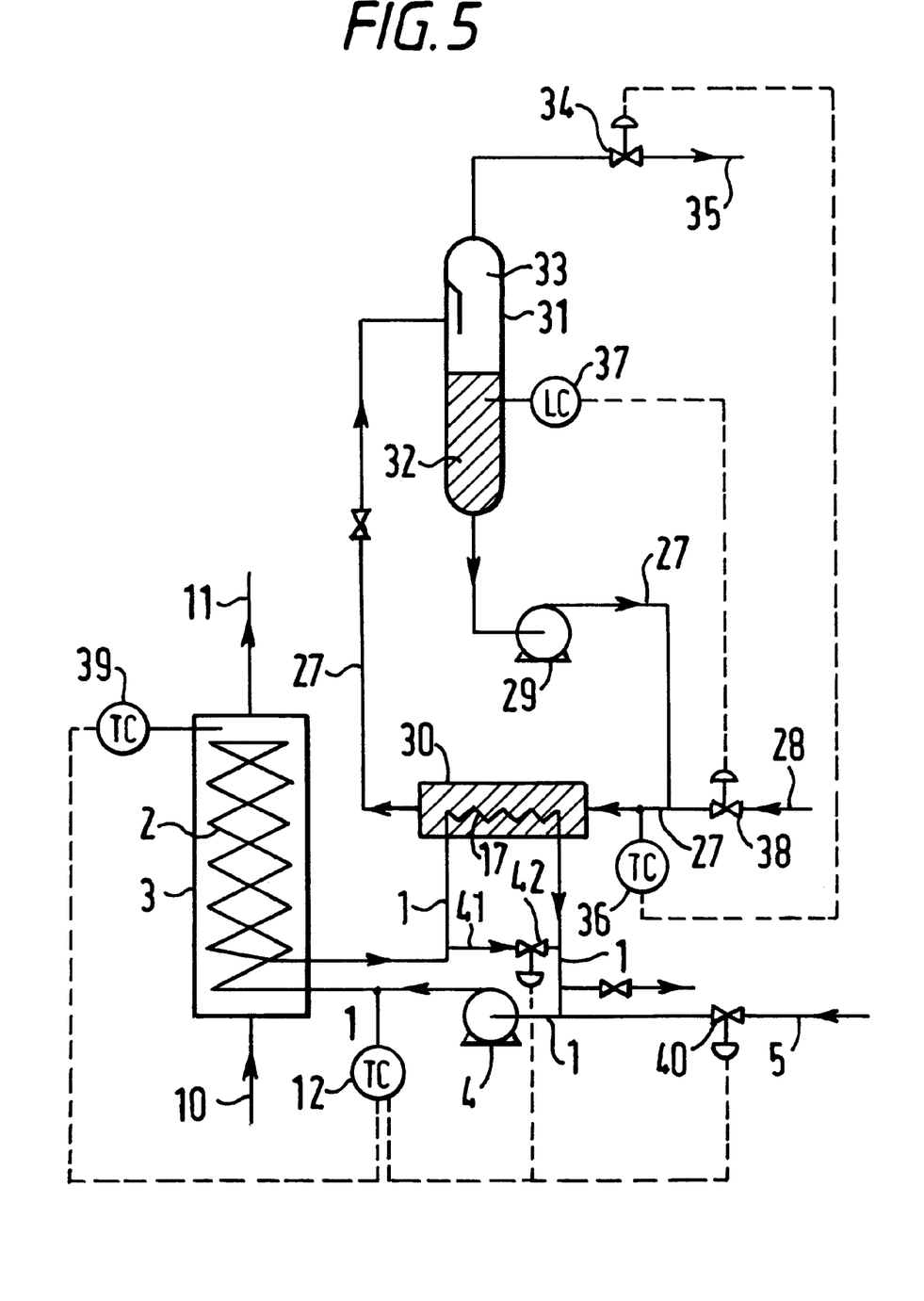
FIG. 5 shows diagrammatically an alternative form of the equipment shown in FIG. 3, where the boiler is replaced by a secondary cooling loop.

Another typical example of the process according to the present invention employing the tubular reactor (3) and the secondary cooling device is shown in FIG. 5. The secondary cooling device consists essentially of a secondary cooling loop (27) into which preferably opens a water make-up (28) especially at a temperature as mentioned above, and which includes a pump (29) intended to circulate superheated water under pressure inside the said secondary loop, a heat exchange zone (30) in which is immersed the secondary heat exchanger (17) intended to cool the primary coolant liquid, and an expansion zone (31) where the superheated water (32) under pressure is expanded, preferably continuously, to produce steam (33) which, separated from the said superheated water, is partially discharged, especially continuously, out of the said secondary loop, for example with the aid of a stop valve (34), to produce low-pressure steam, for example in a conduit (35). The low-pressure steam can be advantageously recovered, especially continuously, at least partly thermally or energetically as described above. The reactor (3) as shown in FIG. 5 has a primary cooling loop as shown in FIG. 3 with identical components, indicated with the same reference numbers.

According to FIG. 5 the temperature of the reaction mixture flowing in the reactor (3) can be regulated by measuring the temperature of the superheated water under pressure circulating in the secondary loop (27) before the entry into the heat exchange zone (30) and by comparing the temperature value thus measured with a desired value fixed in advance, by virtue of a temperature regulating device TC (36) which allows the temperature to be corrected and adjusted by an action of opening and closing the stop valve (34). Devices for regulating temperature TC (12) and TC (39) corresponding respectively to the temperature of the primary coolant liquid and to that of the reaction mixture at the tail of the reactor (3) are linked to a stop valve (40) for feeding primary coolant liquid, fitted in the make-up (5) and to a stop valve (42) fitted in a bypass conduit (41) of the secondary heat exchangers (17) in the primary cooling loop (1). Thus, as above, the device TC (12) can function according to the "split-range" regulation method. The quantity of superheated water (32) in the expansion zone (31) can also be regulated by measuring the level of superheated water (32) in the said zone with the aid of a control device for detection of liquid level LC (37), which compares the level value thus measured with a desired value fixed in advance and by consequently actuating, by virtue of the device (37), the opening or the closing of a stop valve (38) placed in the water make-up (28).

The tubular reactor (3) equipped with the secondary cooling device as shown in FIG. 5 can be placed in an open conduit (that is to say without recirculation or recycling) of a continuous flow of the reaction mixture. It can also be advantageously placed in a closed conduit (that is to say in a recirculation or recycling loop) of a continuous flow of the reaction mixture, including at least the reactor (3), a pump intended to circulate the reaction mixture continuously through the said closed conduit, at least one feed point for monomer and optionally for catalyst, a discharge point for the reaction mixture and optionally one or several heat exchanger(s) and/or static mixer(s), as described in European Patent Application No. 0 755 945.

Figure 6:
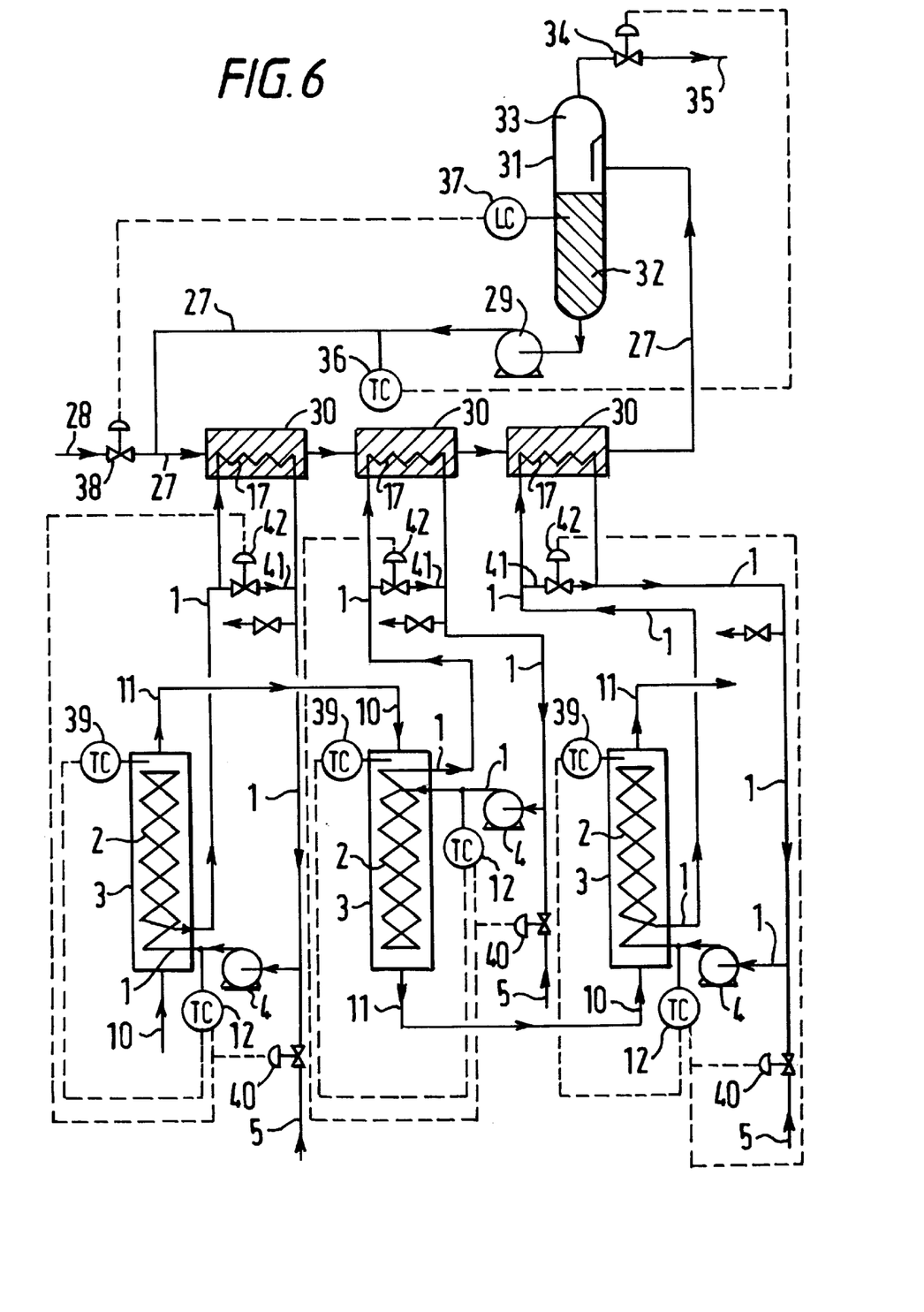
FIG. 6 shows diagrammatically an alternative form of the equipment shown in FIG. 4, where the boiler is replaced by a single secondary cooling loop.

Another preferred alternative form of the process according to the present invention relates to a process where the reaction mixture flows as a continuous stream successively through two or several tubular reactors (for example three tubular reactors (3) as shown in FIG. 6), each possessing its own primary cooling loop (1). In this process, as shown in FIG. 6, the tubular reactors (3) have only one secondary cooling loop (27) in common into which preferably opens a water make-up (28) especially at a temperature as mentioned above, and which includes a pump (29) intended to circulate superheated water under pressure inside the secondary loop (27), heat exchange zones (30) placed in series along the said secondary loop and in which are respectively immersed the secondary heat exchangers (17) of the said reactors, intended to cool the primary coolant liquids, and a single expansion zone (31) where the superheated water (32) under pressure is expanded, preferably continuously, to produce steam (33) which, separated from the said superheated water, is partially discharged, especially continuously, out of the said secondary loop, for example with the aid of a stop valve (34), to produce low-pressure steam, for example in a conduit (35). The low-pressure steam is preferably recovered continuously, as described above, at least partly thermally or energetically. Each tubular reactor (3) as shown in FIG. 6 possesses its own primary cooling loop (1) as shown in FIG. 5 with identical components, indicated with the same reference numbers. The secondary cooling loop (27) as shown in FIG. 6 may possess systems for regulating temperature TC (36) and liquid level LC (37) as described previously in FIG. 5, with identical components, indicated with the same reference numbers. According to FIG. 6 the discharge conduit (11) for the reaction mixture leaving the first reactor (3) in the direction of flow of the said mixture is connected to the feed conduit (10) of the second reactor (3) and thus the discharge and feed conduits are connected between them from one reactor to the other, such that the reaction mixture flows continuously successively through all the reactors (3). The latter may be especially placed in series in an open or closed conduit of a continuous flow of a reaction mixture, as described above.

The alternative form of the process as shown in FIG. 6 has several advantages especially in terms of capital cost. This is because each heat exchange zone (30) corresponds to heat exchangers of conventional type, of low cost and occupying a small volume, with the result that the whole of the secondary cooling loop (27) corresponds to a device which is very compact and lower in operating cost in relation to an atmospheric cooling such as an atmospheric tower or an air-cooling device, even in lost steam operation, that is to say without recovering the low-pressure steam thermally or energetically.

The typical examples and the alternative forms of the process according to the present invention, carried out in the presence of the secondary cooling device, as described above and especially shown diagrammatically in FIGS. 3 to 6, can be particularly useful when the polymerization reaction conducted in the tubular reactor(s) (3) is a bulk (pre) polymerization carried out at a temperature ranging from 110 to 190° C., preferably from 115 to 180° C., optionally with an increasing temperature profile, especially gradually or in plateaux, in the direction of flow of the reaction mixture. This is especially suitable for perfoming a process for continuous production of an expandable styrene-based polymer in aqueous suspension, in which at least one preliminary bulk prepolymerization stage is carried out in one or several tubular reactor(s) (3) where a reaction mixture is flowing continuously in the form of a solution of a styrene-based polymer being formed in at least one styrene-based monomer and optionally at least one inert solvent, especially in a weight proportion lower than 20% relative to the said mixture, optionally in the presence of at least one blowing agent as described above. An example of such a process is described in PCT Patent Application No. 97/08231.

The typical examples and the alternative forms of the process, as shown in FIGS. 3 to 6, are also suitable especially for performing a process for continuous production of a transparent styrene-based polymer or of a high impact styrene-based polymer, in which at least one bulk (pre) polymerization stage is carried out in one or several tubular reactor(s) (3) where a reaction mixture is flowing continuously in the form of a solution of a styrene-based polymer being formed in at least one styrene-based monomer and optionally at least one inert solvent, especially in a weight proportion lower than 20% relative to the said mixture, optionally in the presence of a natural or synthetic rubber grafted or otherwise onto the said polymer being formed. In the case of these various types of polymerization the primary heat exchanger of or of each of the tubular reactor(s) (3) can advantageously have a heat exchange specific area of at least 100 m² per cubic metre of the reaction mixture present in the said reactor. Furthermore it is recommended that the stationary tubular element(s) of the primary heat exchanger should simultaneously produce in the or each of the reactor (s) the effects of a static mixer and of a heat exchanger, the primary coolant liquid preferably flowing inside the stationary tubular element(s) of the said exchanger while the reaction mixture flows outside the said element(s). It is also recommended that, according to another alternative form, the stationary tubular elements of the primary heat exchanger form inside the tubular reactor (3) a bundle of tubes of inner diameter ranging, for example, from 10 to 50 mm, and, for example, of at least 400 mm in length, it being possible for the height of the bundle to measure at least twice its diameter and it being possible for the volume of the primary heat exchanger with a tube bundle to contain preferably at least 50%, more particularly at least 70% of the total volume of the reactor.

When a polymerization is carried out in solution in an inert solvent the reaction mixture flows continuously through tile tubular reactor (3) in the form of a solution of the polymer being formed in at least one inert solvent such as cyclohexane or ethylbenzene, especially in a weight proportion of at least 20% relative to the said mixture, a solution including at least the monomer and optionally at least one catalyst.

The present invention also relates to a process for regulating the temperature of a reaction mixture in solution or in suspension in a liquid in the course of the continuous production of a polymer in a tubular reactor, preferably with plug flow, equipped internally with a primary heat exchanger comprising one or several stationary tubular element(s), by an exothermic polymerization reaction of at least one vinyl monomer, preferably vinyl aromatic or styrenic monomer, a process characterized in that it consists in introducing as a continuous stream into the reactor the reaction mixture including at least the monomer and optionally at least one catalyst and the polymer being formed, at a temperature higher than 100° C. and generally lower than 210° C., preferably at a temperature ranging from 105 to 200° C., in cooling the reaction mixture by contact with the primary heat exchanger connected to a primary cooling loop where a primary coolant liquid circulates, and optionally in cooling the primary coolant liquid by contact with a secondary heat exchanger fitted in the primary cooling loop and immersed in a heat exchange zone of a secondary cooling device containing a secondary coolant liquid, and in that the primary coolant liquid employed in the absence of a secondary cooling device or the secondary coolant liquid consists essentially of superheated water under pressure which, by an equilibrium or an expansion, produces steam, preferably continuously, which, separated from the said superheated water, is partially discharged, especially continuously, out of the said primary loop or the said secondary cooling device in the form of a low-pressure steam, the superheated water thus separated off having preferably added to it, especially continuously, a make-up of water at a temperature lower than or equal to the temperature of the reaction mixture in the reactor, in particular lower than or equal to 105° C. or 110° C., for example at ambient temperature.

All that has been described above for the typical examples, the alternative forms and the preferred components of the continuous process for polymer production is also suitable for the present process of temperature regulation.

The following examples illustrate the present invention.

EXAMPLE 1

A continuous production of a high impact polystyrene modified with 1,4-polybutadiene, is carried out according to a bulk polymerization process in equipment as shown in FIG. 4, with the exception that five tubular reactors (3) are employed instead of the three reactors (3) shown in FIG. 4. Each reactor (3) is equipped with a primary cooling loop (1) which includes the components as shown in FIG. 4, in particular a pump (4) and a secondary heat exchanger (17). Inside each primary cooling loop (1) circulates an organic heating liquid (a non-boiling hydrocarbon in the conditions of the process) known under the name "Therminol 66"® sold by Monsanto as a liquid one-phase stream. The five tubular reactors (3) are of plug-flow type and have the double effect of a static mixer with radial diffusion and of a heat exchanger with a heat exchange specific area greater than 100 m²/m³. They are known under the name "SMR"® and sold by Sulzer (Switzerland). The five tubular reactors (3) have in common a secondary cooling device essentially consisting of a heat exchange zone in the form of a boiler (18) inside which are placed the five secondary heat exchangers (17) of the five reactors (3). The boiler (18) contains superheated water under pressure at 110° C., and a make-up (19) of superheated water at 110° C. is produced via the stop valve (26).

In a preliminary stage not shown in FIG. 4 a styrene prepolymer modified with 7% by weight of 1,4-polybutadiene is first of all produced continuously by continuously introducing into a mechanically stirred reactor styrene, a solution (heated to 60° C.) of 1,4-polybutadiene in styrene, and tert-butyl peracetate employed as catalyst. The reaction mixture thus formed is kept stirred at 115° C. and is drawn off continuously from the reactor so that it contains 30% by weight of polymer formed and/or grafted.

The reaction mixture thus drawn off then flows as a continuous stream and a flow rate of 14 514 kg/h through the five tubular reactors (3) through the intermediacy of the feed and discharge conduits (10) and (11). At the exit of the fifth tubular reactor (3) in the direction of flow of the reaction mixture the reaction mixture contains 85% by weight of polymer formed and/or grafted.

The precise conditions of operation of the equipment and especially of the five tubular reactors (3) are given in Table 1.

Thus, the total heating capacity discharged by the five tubular reactors (3) is 1300 kW. The flow rate of low-pressure steam produced by the stop valve (22) in the conduit (23) is 2105 kg/h at an absolute pressure of 0.15 MPa. The low-pressure steam is partly recovered thermally for heating styrene at 60° C. intended to dissolve the 1,4-polybutadiene and thus to prepare the solution of 1,4-polybutadiene in the preliminary stage.

EXAMPLE 2

A continuous production of a high impact polystyrene modified with 1,4-polybutadiene is carried out according to a bulk polymerization process in equipment as shown in FIG. 6, with the exception that four tubular reactors (3) are employed instead of the three reactors (3) shown in FIG. 6. Each reactor (3) is equipped with a primary cooling loop (1) which includes the components as shown in FIG. 6, in particular a pump (4) and a secondary heat exchanger (17) immersed in a heat exchange zone (30). Inside each primary cooling loop (1) circulates an organic heating liquid (a non-boilinig hydrocarbon in the conditions of the process) known under the name "Therminol 66"® sold by Monsanto as a liquid one-phase stream. The four tubular reactors (3) are of plug-flow type and have the double effect of a static mixer with radial diffusion and of a heat exchanger with a heat exchange specific area greater than 100 m²/m³. They are known under the name "SMR"® and sold by Sulzer (Switzerland).

The four tubular reactors (3) have in common a secondary cooling loop (27) with the components as shown in FIG. 6, especially a pump (29), an expansion zone (31) and four heat exchange zones (30) placed in series along the said secondary loop, where superheated water under pressure circulates at a flow rate of 80000 kg/h and a make-up (28) of water superheated to 110° C. via the stop valve (38) at a flow rate of 1654 kg/h.

In a preliminary stage not shown in FIG. 6 a styrene prepolymer modified with 7% by weight of 1,4-polybutadiene is first of all produced continuously by continuously introducing into a mechanically stirred reactor styrene, a solution (heated to 60° C.) of 1,4-polybutadiene in styrene and tert-butyl peracetate employed as catalyst. The reaction mixture thus formed is kept stirred at 115° C. and is drawn off continuously from the reactor so that it contains 30% by weight of polymer formed and/or grafted.

The reaction mixture thus drawn off then flows as a continuous stream and a flow rate of 12800 kg/h through the four tubular reactors (3) through the intermediacy of feed and discharge conduits (10) and (11). At the exit of the fourth tubular reactor (3), in the direction of flow of the reaction mixture, the reaction mixture contains 82% by weight of polymer formed and/or grafted.

The precise conditions of operation of the equipment and especially of the four tubular reactors (3) are given in Table 2.

Thus, the total heating capacity discharged by the four tubular reactors (3) is 1023 kW. Tile flow rate of low-pressure steam produced by tile stop valve (34) in the conduit (35) is 1654 kg/h at an absolute pressure of 0.15 MPa. The low-pressure steam is partly recovered thermally for heating styrene at 60° C. intended to dissolve the 1,4-polybutadiene and thus to prepare the solution of 1,4-polybutadiene in the preliminary stage.

TABLE 1

Operating conditions of the process of Example 1

| Conditions | nth reactor (3) in the direction of flow of the reaction mixture | | | | |
| --- | --- | --- | --- | --- | --- |
| | 1st reactor | 2nd reactor | 3rd reactor | 4th reactor | 5th reactor |
| Temperature (° C.) of the reaction mixture circulating in: | | | | | |
| the conduit (10) at the entry of the reactor (3): | 115 | 125 | 134 | 143 | 153 |
| the conduit (11) at the exit of the reactor (3): | 125 | 134 | 143 | 153 | 156 |
| Flow rate of the "Therminol 66" ® circulating in the primary heat exchanger (2) (kg/h) | 46,800 | 46,800 | 59,400 | 59,400 | 55,800 |
| Temperature (° C.) of the "Therminol 66" ® circulating in the primary loop (1): | | | | | |
| at the entry of the secondary heat exchanger (17): | 122.6 | 128.9 | 136.1 | 145.8 | 156.7 |
| at the exit of the secondary heat exchanger (17): | 117.4 | 119.1 | 127.1 | 136.2 | 147.3 |
| Heating capacity discharged by reactor (kW) | 130 | 245 | 315 | 315 | 295 |
| Logarithmic mean temperature difference between the inside and the outside of the secondary heat exchanger (17) in the boiler (18) (° K.) | 9.8 | 13.4 | 21.3 | 30.8 | 31.8 |
| U × A (kW/° K.) of the secondary heat exchanger (17) | 13.3 | 18.3 | 14.8 | 10.2 | 9.3 |

U: Heat exchange coefficient
A: Heat exchange area

TABLE 2

Operating conditions of the process of Example 2

| Conditions | nth reactor (3) in the direction of flow of the reaction mixture | | | |
|---|---|---|---|---|
| | 1st reactor | 2nd reactor | 3rd reactor | 4th reactor |
| Temperature (° C.) of the reaction mixture circulating in: | | | | |
| the conduit (10) at the entry of the reactor (3): | 115 | 147 | 162 | 167 |
| the conduit (11) at the exit of the reactor (3): | 147 | 162 | 167 | 170 |
| Flow rate of the "Therminol 66" ® circulating in the primary heat exchanger (2) (kg/h) | 45,000 | 46,000 | 45,500 | 43,500 |
| Temperature (° C.) of the "Therminol 66" ® circulating in the primary loop (1): | | | | |
| at the entry of the secondary heat exchanger (17): | 132 | 138 | 146 | 157 |
| at the exit of the secondary heat exchanger (17): | 124 | 118 | 138 | 151 |
| Heating capacity discharged by reactor (kW) | 206 | 487 | 192 | 138 |
| Temperature (° C.) of the superheated water under pressure circulating in the secondary loop (27): | | | | |
| at the entry of the heat exchange zone (30): | 110 | 112.2 | 117.4 | 119.5 |
| at the exit of the heat exchange zone (30): | 112.2 | 117.4 | 119.5 | 121 |
| Logarithmic mean temperature difference between the inside and the outside of the secondary heat exchanger (17) in the heat exchange zone (30) (° K.) | 16.7 | 11.7 | 23.4 | 33.7 |
| U × A (kW/° K.) of the secondary heat exchanger (17) | 12.3 | 41.8 | 8.2 | 4.1 |

U: Heat exchange coefficient
A: Heat exchange area

I claim:

1. A continuous process for the production of a polymer by an exothermic polymerization reaction of at least one vinyl monomer, comprising reacting in at least one polymerization stage a reaction mixture in the form of a liquid or in the form of a suspension including at least the one vinyl monomer and optionally at least one radical or ionic initiator and the polymer being formed, said reaction mixture flowing at a temperature higher than 100° C. as a continuous stream through at least one tubular reactor equipped internally with a primary heat exchanger having one or more stationary tubular element(s), for cooling the reaction mixture, said primary heat exchanger being connected to a primary cooling loop where a primary coolant liquid circulates, and said primary coolant liquid being optionally cooled by a secondary heat exchanger fitted in the primary cooling loop and placed in a heat exchange zone of a secondary cooling device containing a secondary coolant liquid, wherein when the primary coolant liquid is not cooled by said secondary heat exchanger, the primary coolant liquid consists essentially of superheated water under pressure which, by an equilibrium or an expansion, produces steam which, separated from the superheated water, is partially discharged out of the primary loop in the form of a low-pressure steam, and when the primary coolant liquid is cooled by said secondary heat exchanger, the secondary coolant liquid consists essentially of superheated water under pressure which, by an equilibrium or an expansion, produces steam which, separated from the said superheated water, is partially discharged from the secondary cooling device in the form of a low-pressure steam.

2. Process according to claim 1, wherein the low-pressure steam is recovered at least partly thermally or energetically in another part or stage of the process, or in another process.

3. Process according to claim 1, wherein the low-pressure steam is recovered at least partly thermally or energetically in a stage of (pre)heating of one or more constituents of the reaction mixture or of the reaction mixture itself feeding the tubular reactor, or in a stage of dissolving a natural or synthetic rubber with heating in a styrene-based monomer during the production of a high impact styrene-based polymer, or in a stage preliminary or after to the polymerization stage carried out in the tubular reactor, or in a stage of heating the reaction mixture, intended to increase the final degree of conversion of the monomer to polymer or to halt the polymerization, or in a final stage of separation of the polymer from the unreacted monomer(s) and optionally from the oligomers, or else in a stage of purification and of recycling of the unreacted monomer(s) and optionally of the inert solvent(s) present.

4. Process according to claim 1, wherein the reaction is a radical polymerization initiated thermally or with the aid of at least one radical initiator generating free radicals.

5. Process according to claim 1, wherein the absolute pressure of the low-pressure steam is chosen in the range extending from 0.12 to 1.1 MPa, preferably from 0.12 to 0.3 MPa.

6. Process according to claim 1, wherein the reaction is a polymerization of a vinylaromatic monomer or of a mixture of vinylaromatic monomers optionally in the presence of a nitrile or of an ester of acrylic or methacrylic acid and/or of a natural or synthetic rubber.

7. Process according to claim 1, wherein after having separated and partially discharged the steam out of the primary loop or from the secondary cooling device, the superheated water under pressure has added to it a make-up of water at a temperature lower than or equal to the temperature of the reaction mixture in the reactor.

8. Process according to claim 1, wherein the primary heat exchanger has a heat exchange specific area of at least 50 m$^2$ per cubic metre of the reaction mixture present in the reactor.

9. Process according to claim 1, wherein the stationary tubular element(s) of the primary heat exchanger produces (produce) in the reactor simultaneously the effects of a static mixer and of a heat exchanger, and in that the primary coolant liquid flows inside the stationary tubular element(s) of the primary heat exchanger, while the reaction mixture flows outside the said element(s).

10. Process according to claim 1, wherein the stationary tubular elements form inside the reactor a bundle of tubes of inner diameter ranging from 10 to 50 mm and of at least 400 mm in length, the height of the bundle measuring at least twice its diameter, the reaction mixture flowing preferably inside the tubes, while the primary coolant liquid flows outside.

11. Process according to claim 10, wherein before entering the reactor the reaction mixture flows as a continuous stream through a static mixer.

12. Process according to claim 1, wherein the tubular reactor(s) is(are) placed in a closed conduit of a continuous flow of the reaction mixture, including at least the said tubular reactor(s), a pump intended to circulate the said mixture continuously through the said closed conduit, at least one feedpoint for monomer and optionally for catalyst, a discharge point for the reaction mixture and optionally one or more heat exchanger(s) and/or static mixer(s).

13. Process according to claim 1, wherein when the primary coolant liquid is not cooled by said secondary heat exchanger, the difference between the maximum temperature of the reaction mixture flowing in the tubular reactor and the temperature of the superheated water under pressure of the primary cooling loop at the entry of the primary heat exchanger is at most 30° C.

14. Process according to claim 1, wherein when the primary coolant liquid is not cooled by said secondary heat exchanger, the primary cooling loop includes the primary heat exchanger placed inside the reactor and intended to cool the reaction mixture, a pump intended to circulate the superheated water under pressure inside the said loop, optionally a make-up of water opening into the said loop and an expansion zone where the superheated water under pressure is expanded to produce steam which, separated from the said superheated water, is partially discharged out of the said loop to produce low-pressure steam.

15. Process according to claim 1, wherein the reaction mixture flows as a continuous stream successively through two or more tubular reactors and that when the primary coolant liquid is not cooled by said secondary heat exchanger, each tubular reactor possesses its own primary cooling loop which includes the primary heat exchanger placed inside the reactor and intended to cool the reaction mixture, a pump intended to circulate superheated water under pressure inside the said loop, optionally a make-up of water opening into the said loop, and an expansion zone where the superheated water under pressure is expanded to produce steam which, separated from the said superheated water, is partially discharged out of the said loop to produce low-pressure steam which preferably is recovered and combined with the low-pressure steam produced by the other reactors in the same steam system.

16. Process according to claim 14, wherein the polymerization reaction conducted in the tubular reactor(s) is an aqueous suspension polymerization carried out at a temperature ranging from 105 to 160° C., optionally with an increasing temperature profile in the direction of flow of the reaction mixture.

17. Process according to claim 1, wherein when the primary coolant liquid is cooled by said secondary heat exchanger the difference between the maximum temperature of the reaction mixture flowing in the tubular reactor and the minimum temperature of the superheated water under pressure in contact with the secondary heat exchanger is at most 80° C.

18. Process according to claim 1, wherein the difference between the temperature of the primary coolant liquid at the entry of the secondary heat exchanger and the minimum temperature of the superheated water under pressure in contact with the secondary heat exchanger is at most 75° C.

19. Process according to claim 1, wherein the secondary cooling device includes essentially a heat exchange zone consisting of a boiler into which a make-up of water preferably opens, a boiler inside which is placed the secondary heat exchanger intended to cool the primary coolant liquid and which contains superheated water under pressure in equilibrium with steam which, separated from the said superheated water, is partially discharged out of the boiler to produce low-pressure steam.

20. Process according to claim 1, wherein the reaction mixture flows as a continuous stream successively through two or several tubular reactors and in that each tubular reactor possesses its own primary cooling loop and its own secondary cooling device including essentially a heat exchange zone consisting of a boiler into which preferably opens a water make-up, a boiler inside which is placed the secondary heat exchanger intended to cool the primary coolant liquid of the said reactor and which contains superheated water under pressure in equilibrium with steam which, separated from the said superheated water, is partially discharged out of the said boiler to produce low-pressure steam, preferably combined with the low-pressure steam produced by the other boilers in a single steam system.

21. Process according to claim 1, wherein the reaction mixture flows as a continuous stream successively through two or several tubular reactors, each possessing its own primary cooling loop, and in that the said reactors possess a single secondary cooling device in common including essentially a heat exchange zone consisting of a single boiler into which optionally opens a water make-up, a single boiler inside which are placed the secondary heat exchangers of the said reactors, intended to cool the primary coolant liquids, and which contains superheated water under pressure in equilibrium with steam which separated from the said superheated water, is partially discharged out of the boiler to produce low-pressure steam.

22. Process according to claim 1, wherein the secondary cooling device consists essentially of a secondary cooling loop into which optionally opens a water make-up and which includes a pump intended to circulate the superheated water under pressure inside the said loop, a heat exchange zone in which is immersed the secondary heat exchanger intended to cool the primary coolant liquid, and an expansion zone where the superheated water under pressure is expanded to produce steam which, separated from the said superheated water, is partially discharged out of the said loop to produce low-pressure steam.

23. Process according to claim 1, wherein the reaction mixture flows as a continuous stream successively through two or several tubular reactors, each possessing its own primary cooling loop, and in that the said reactors possess a single secondary cooling loop in common into which optionally opens a water make-up and which includes a pump intended to circulate the superheated water under pressure inside the loop, heat exchange zones placed in series along the said loop and in which are immersed the secondary heat exchangers of the said reactors, intended to cool the primary coolant liquids, and a single expansion zone where the superheated water under pressure is expanded to produce steam which, separated from the said superheated water, is partially discharged out of the said loop to produce low-pressure steam.

24. Process according to claim 17, wherein the polymerization reaction conducted in the tubular reactor(s) is a bulk (pre)polymerization carried out at a temperature ranging from 110 to 190° C., optionally with an increasing temperature profile in the direction of flow of the reaction mixture.

25. Process according to claim 13, wherein the primary heat exchanger of or of each of the tubular reactor(s) has a heat exchange specific area of at least 100 $m^2$ per cubic metre of the reaction mixture present in the said reactor, and in that the stationary tubular element(s) of the primary heat exchanger produces(produce) simultaneously in the or each of the reactor(s) the effects of a static mixer and of a heat exchanger.

26. Process according to claim 17, wherein the primary heat exchanger of or of each of the tubular reactor(s) has a heat exchange specific area of at least 100 $m^2$ per cubic metre of the reaction mixture present in the said reactor and in that the stationary tubular elements of the primary heat exchanger form inside the reactor a bundle of tubes of inner diameter ranging from 10 to 50 mm and of at least 400 mm in length, the height of the bundle measuring at least twice its diameter.

27. Process according to claim 13, wherein the continuous production of an expandable styrene-based polymer at least one stage of polymerization in aqueous suspension of at least one styrene-based monomer is carried out in one or several tubular reactor(s) where a reaction mixture is flowing continuously including at least one styrene-based monomer, an inorganic or organic dispersing agent, water, a styrene-based polymer being formed and optionally at least one blowing agent.

28. Process according to claim 17, wherein the continuous production of an expandable styrene-based polymer in aqueous suspension at least one preliminary bulk prepolymerization stage is carried out in one or several tubular reactor (s) where a reaction mixture is flowing continuously in the form of a solution of a styrene-based polymer being formed in at least one styrene-based monomer and optionally at least one inert solvent, optionally in the presence of at least one blowing agent.

29. Process according to claim 17, wherein the continuous production of a transparent styrene-based polymer or of a high impact styrene-based polymer at least one bulk (pre) polymerization stage is carried out in one or several tubular reactor(s) where a reaction mixture is flowing continuously in the form of a solution of a styrene-based polymer being formed in at least one styrene-based monomer and optionally at least one inert solvent, optionally in the presence of a natural or synthetic rubber grafted or otherwise onto the styrene polymer being formed.

30. Process according to claim 8, wherein the primary heat exchanger has a heat exchange specific area of at least 80 m$^2$ per cubic meter of the reaction mixture present in the reactor.

31. Process according to claim 13, wherein the difference is at most 20° C.

32. Process according to claim 15, wherein the polymerization reaction conducted in the tubular reactor(s) is an aqueous suspension polymerization carried out at a temperature ranging from 105 to 160° C., optionally with an increasing temperature profile in the direction of flow of the reaction mixture.

33. Process according to claim 17, wherein the difference is at most 50° C.

34. Process according to claim 18, wherein the difference between the temperature of the primary coolant liquid at the entry of the secondary heat exchanger and the minimum temperature of the superheated water under pressure in contact with the secondary heat exchanger is at most 45° C.

35. Process for regulating the temperature of a reaction mixture in solution or in suspension in a liquid in the course of the continuous production of a polymer in a tubular reactor equipped internally with a primary heat exchanger having one or more stationary tubular element(s), by an exothermic polymerization reaction of at least one vinyl monomer, said process comprising introducing as a continuous stream into the reactor a reaction mixture including at least the one vinyl monomer and optionally at least one radical or ionic initiator and the polymer being formed, said reaction mixture being at a temperature higher than 100° C., and cooling the reaction mixture by contact with the primary heat exchanger connected to a primary cooling loop where a primary coolant liquid circulates and said primary coolant liquid being optionally cooled by a secondary heat exchanger fitted in the primary cooling loop and placed in a heat exchange zone of a secondary cooling device containing a secondary coolant liquid, wherein when the primary coolant liquid is not cooled by the secondary heat exchanger, the primary coolant liquid consists essentially of superheated water under pressure which, by an equilibrium or an expansion, produces steam which, separated from the superheated water, is partially discharged out of the primary loop in the form of a low-pressure steam, and when the primary coolant liquid is cooled by the secondary heat exchanger, the secondary coolant liquid consists essentially of superheated water under pressure which, by an equilibrium or an expansion, produces steam which, separated from the said superheated water, is partially discharged from the secondary cooling device in the form of a low-pressure steam, the superheated water thus separated off in each case having optionally added to it a make-up of water at a temperature lower than or equal to the temperature of the reaction mixture in the reactor.

36. Process according to claim 16 wherein the temperature range is from 110 to 150° C.

37. Process according to claim 32 wherein the temperature range is from 110 to 150° C.

38. Process according to claim 24, wherein the temperature range is from 115 to 180° C.

* * * * *